United States Patent [19]
Schwartz

[11] 3,980,819
[45] Sept. 14, 1976

[54] EDGE ENHANCEMENT FOR TELEVISION IMAGES

[75] Inventor: James W. Schwartz, Deerfield, Ill.

[73] Assignee: Zenith Radio Corporation, Chicago, Ill.

[22] Filed: Nov. 1, 1974

[21] Appl. No.: 519,980

[52] U.S. Cl. .................... 178/7.5 R; 178/DIG. 25; 178/DIG. 34; 313/421
[51] Int. Cl.² ........................................... H04N 5/14
[58] Field of Search ............. 178/DIG. 25, DIG. 34, 178/7.5 R; 313/432, 439, 437, 421

[56] References Cited
UNITED STATES PATENTS

| | | | |
|---|---|---|---|
| 2,678,964 | 5/1954 | Loughlin | 178/7.5 R |
| 3,377,425 | 4/1968 | Buzan | 178/DIG. 25 |
| 3,479,453 | 11/1969 | Townsend | 178/6.7 |
| 3,629,498 | 12/1971 | Tan | 178/DIG. 25 |
| 3,798,353 | 3/1974 | Illetschko | 178/DIG. 25 |
| 3,830,958 | 8/1974 | Fuse et al. | 178/DIG. 34 |
| 3,859,544 | 1/1975 | Nero | 178/DIG. 34 |

Primary Examiner—Robert L. Griffin
Assistant Examiner—Michael A. Masinick
Attorney, Agent, or Firm—John J. Pederson

[57] ABSTRACT

Method and apparatus for enhancing the edges of video images displayed on a cathode ray tube. The scanning velocity of the cathode ray tube electron beam is modulated so as to counteract the blurring effect which occurs when a video amplitude transition causes an increase in beam current and a corresponding increase in the size of the electron beam spot at the screen of the cathode ray tube. When such a transition occurs, the beam is deflected in the direction of normal scan at a rate which corresponds to the rate of change in the size of the diameter of the spot so as to substantially arrest the spot edge, thereby causing a displayed video transition to have a better defined vertical edge. Horizontal edges of images are sharpened by auxiliary vertical deflection of the electron beam. Image edges are further improved by a video peaking scheme which eliminates the large spot size growth usually associated with large amplitude video transitions which have been peaked.

29 Claims, 20 Drawing Figures

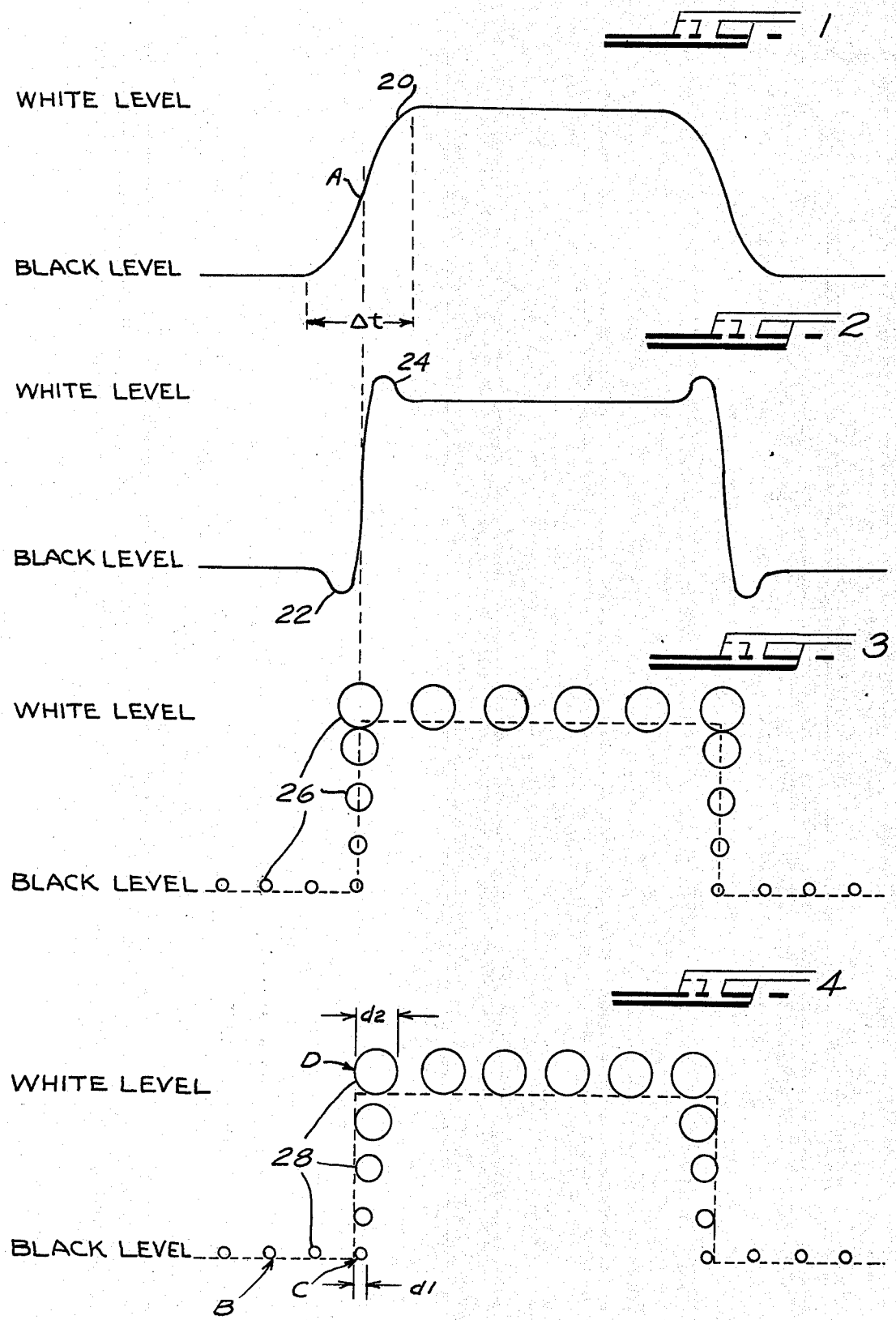

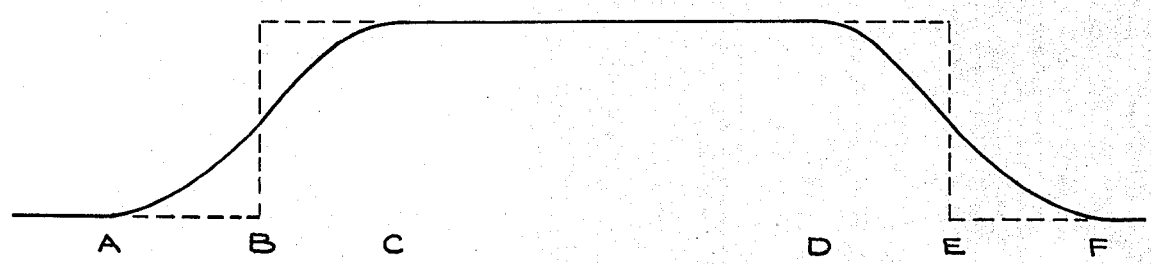
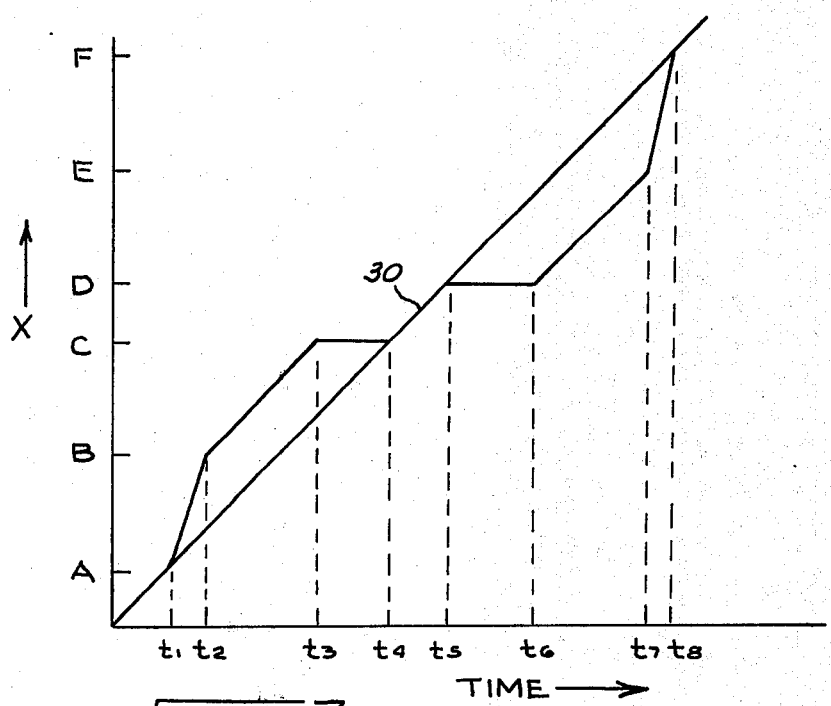
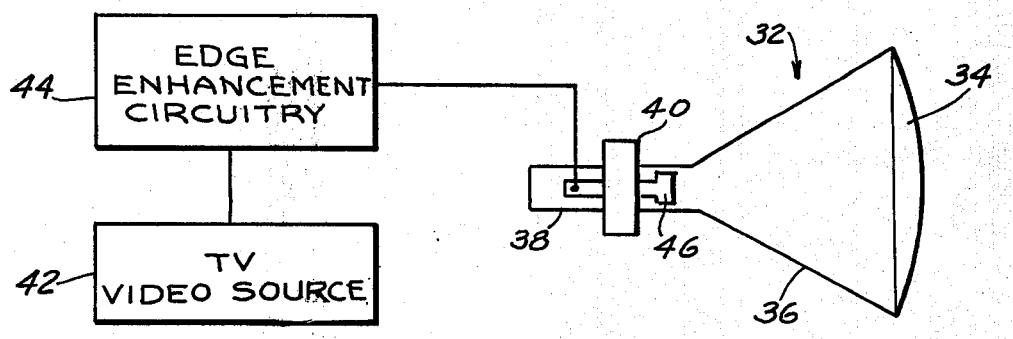

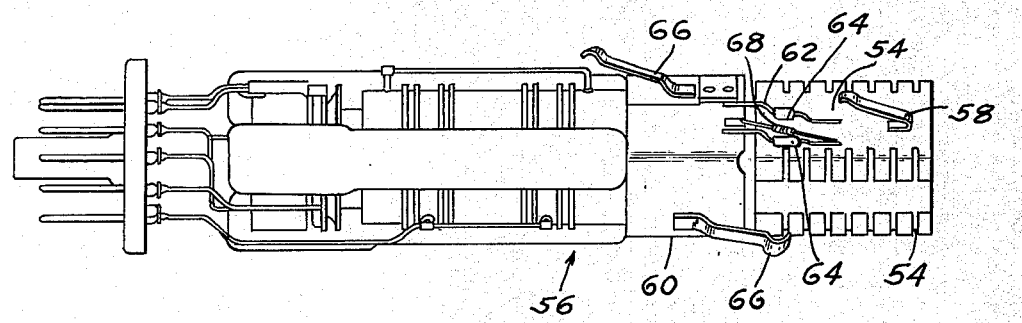
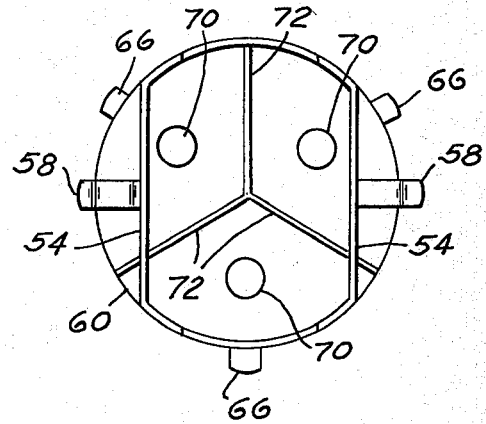
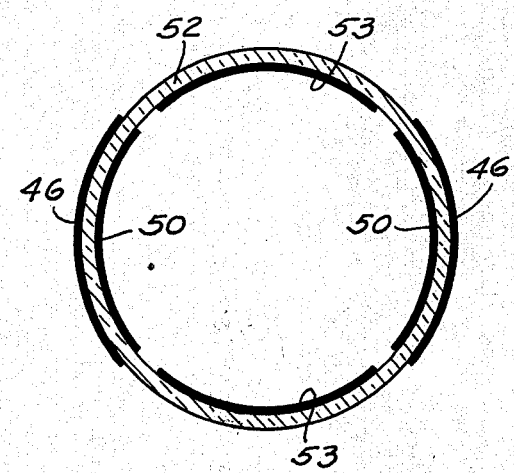
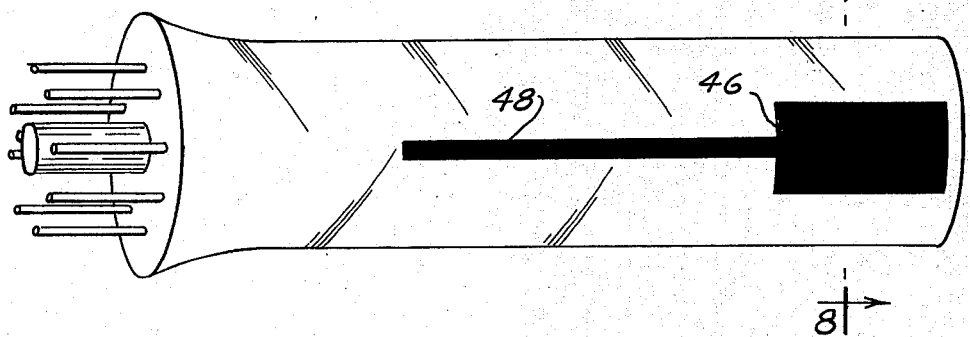

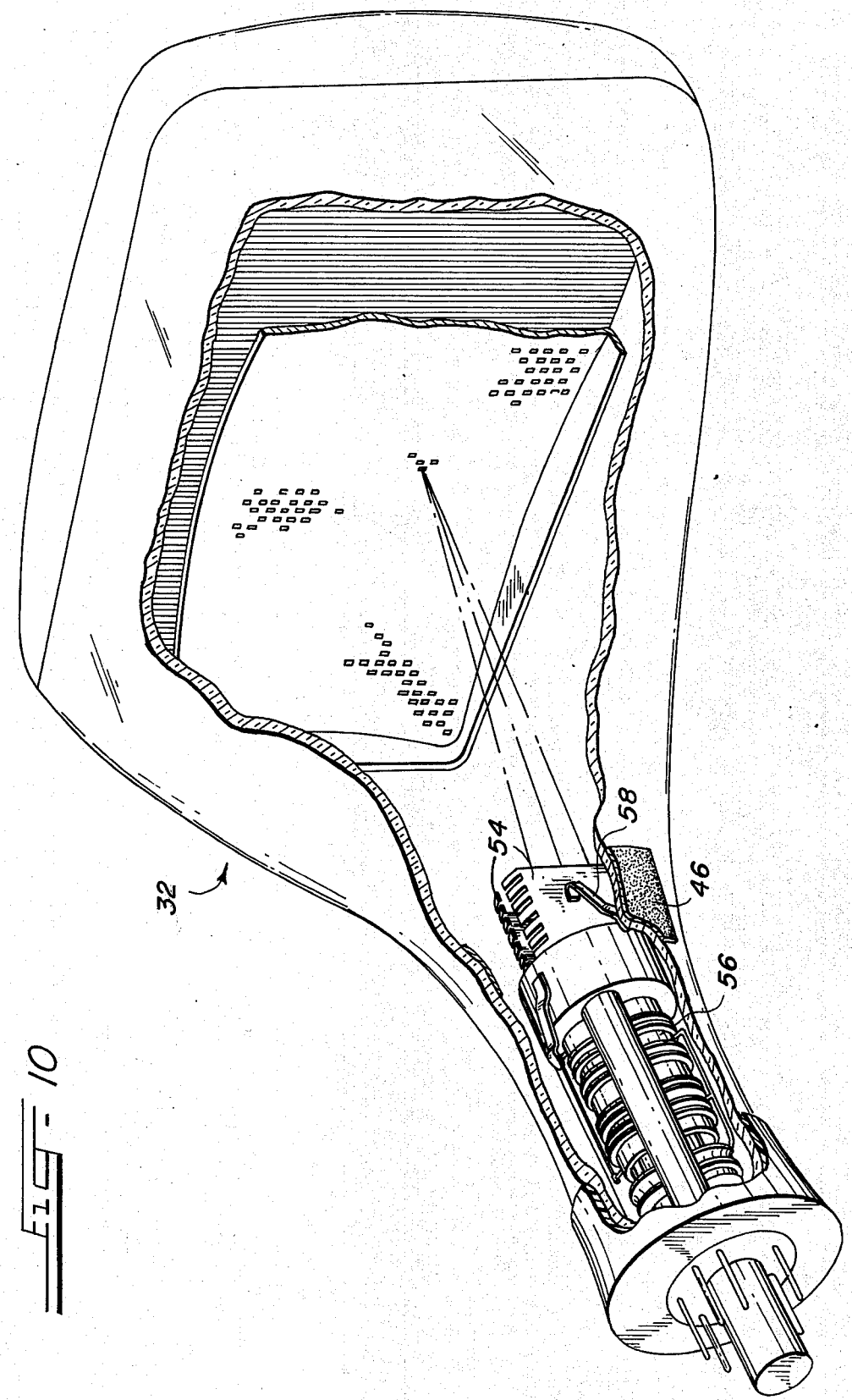

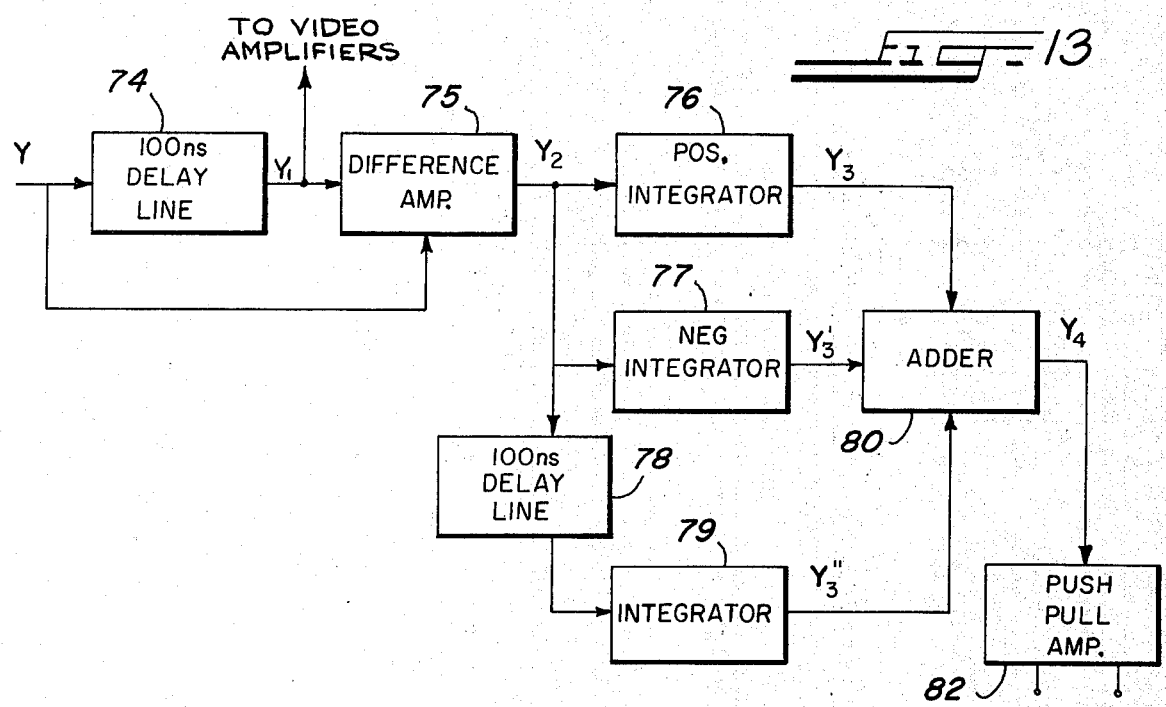
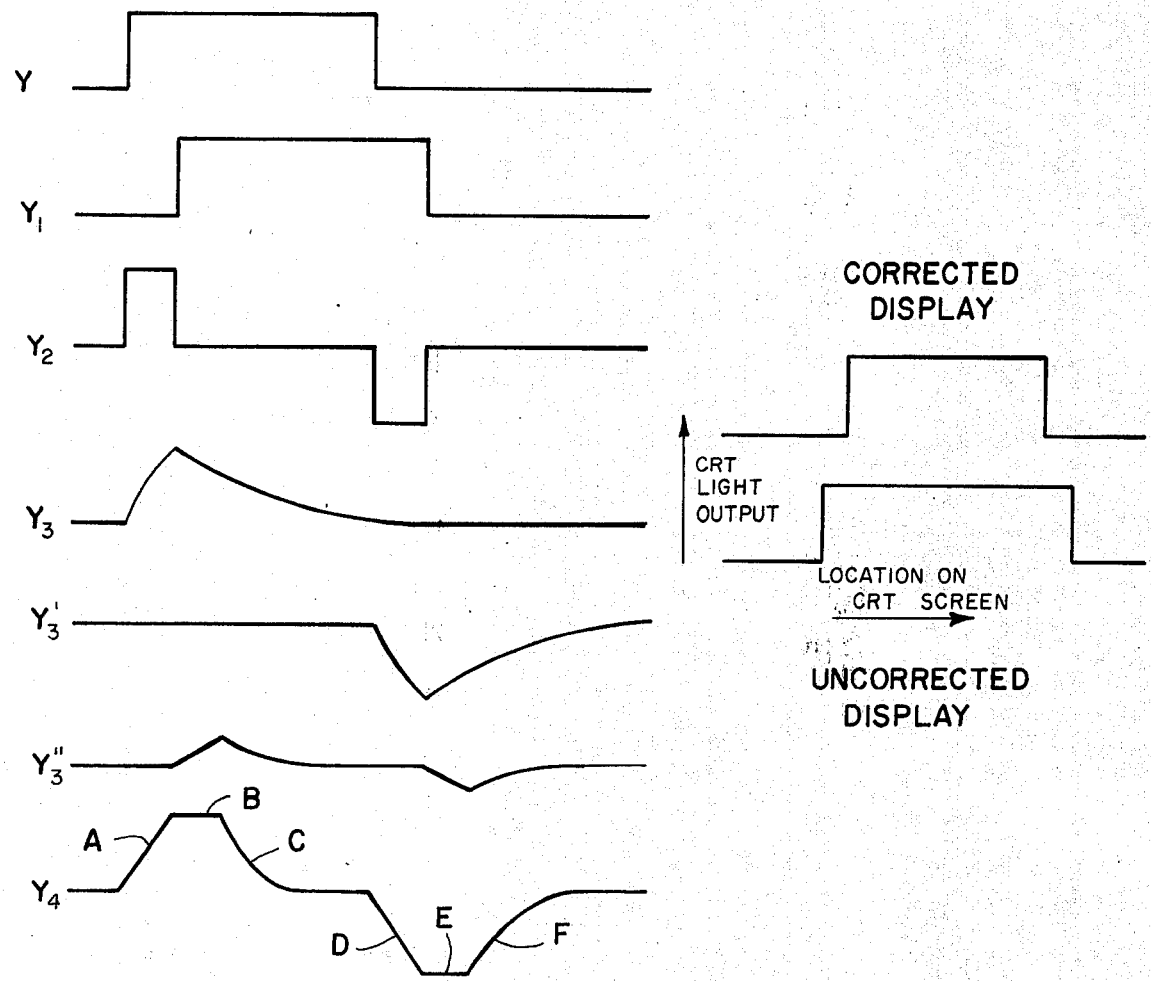
FIG-13

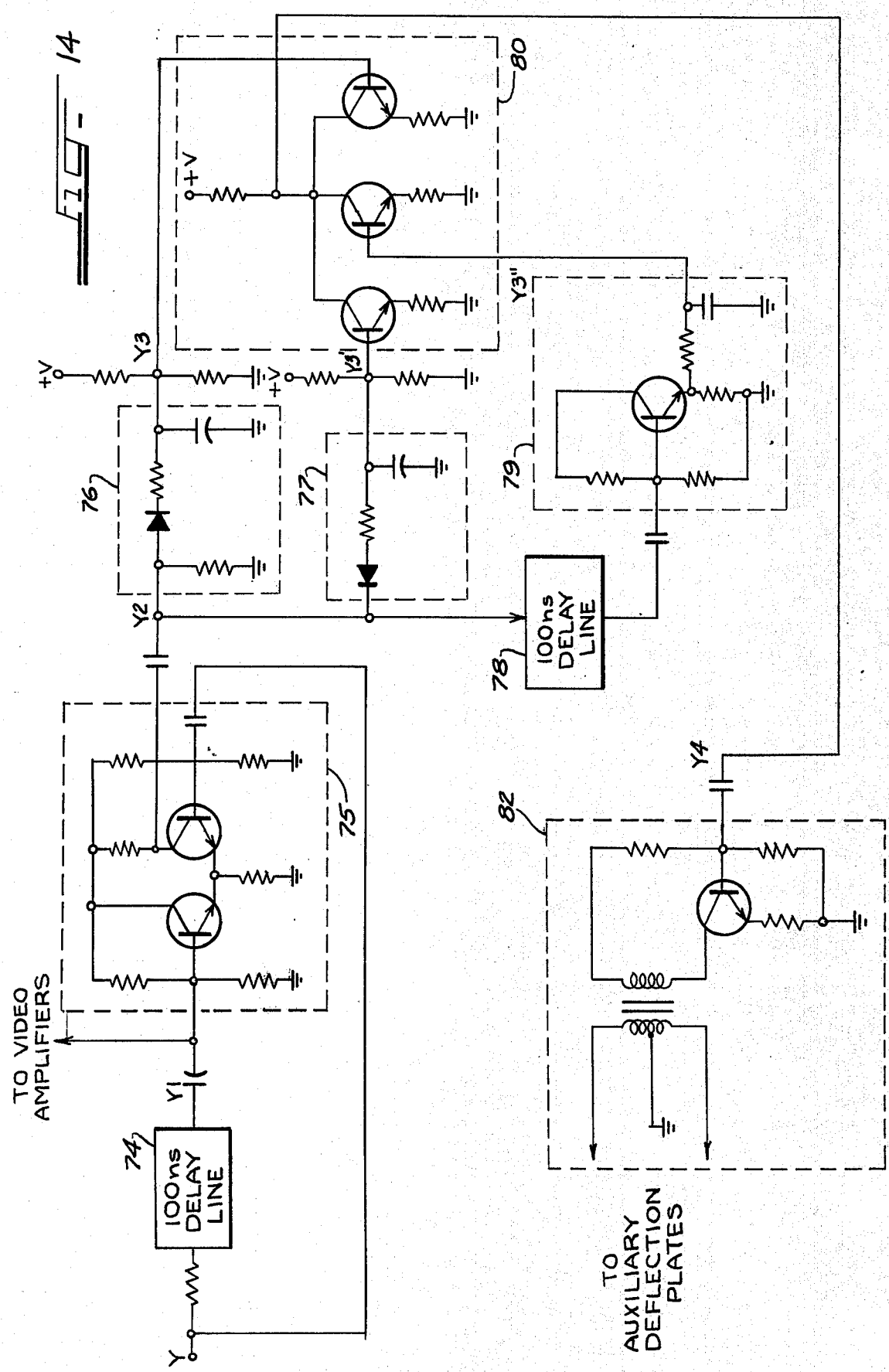

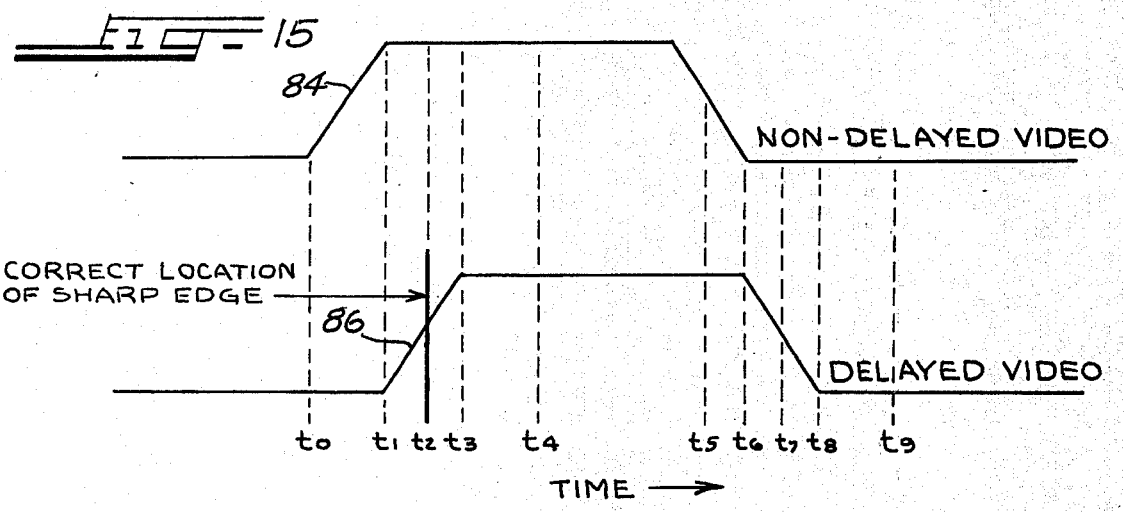
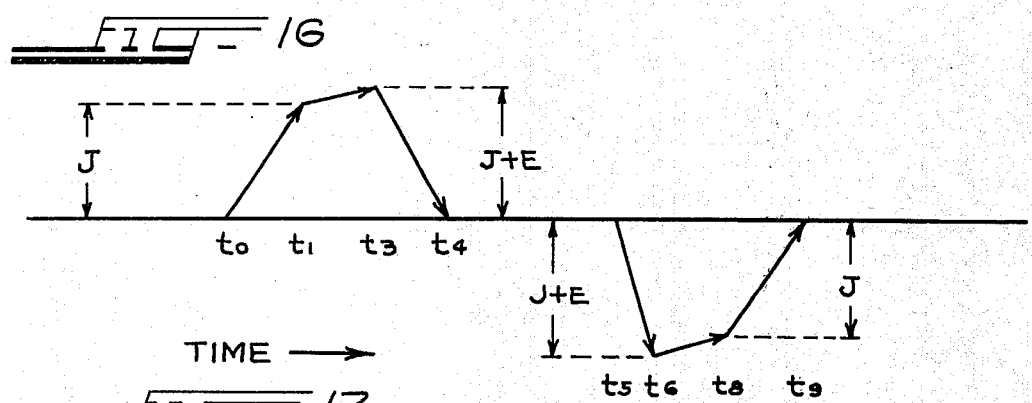
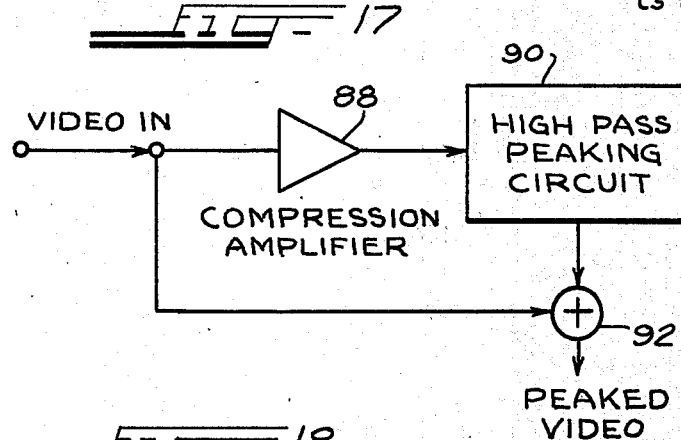
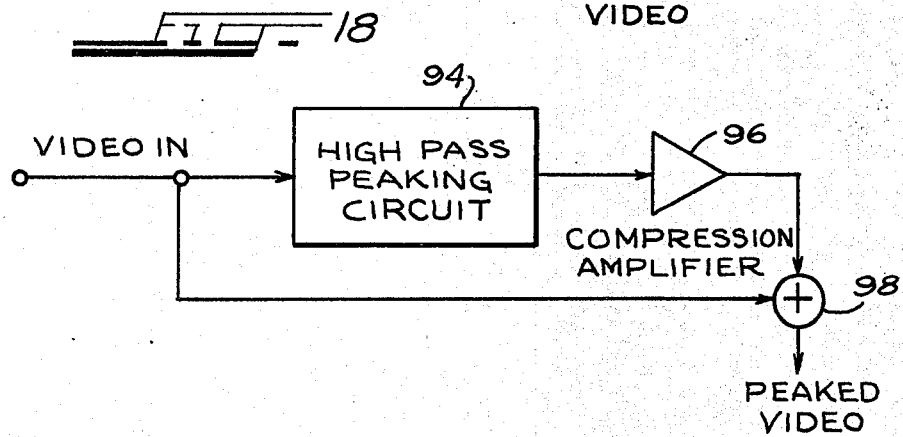

EDGE ENHANCEMENT FOR TELEVISION IMAGES

BACKGROUND OF THE INVENTION

This invention relates generally to television receivers and is specifically directed to improving the apparent resolution of images displayed by television cathode ray tubes.

The sharpness and crispness of a television image is dependent on factors such as the bandwidth of the transmitted signal, the bandwidth of the receiver circuitry, and the resolution capabilities of the image reproducing device. In the case of television receivers using cathode ray tubes as image reproducing devices, the spot size of the scanning electron beam is an important parameter in determining overall resolution capability.

In most cathode ray tubes, the spot size of the electron beam increases significantly as the beam current is increased. Therefore, when a large black-to-white video transition occurs, i.e., when a TV image includes a white area immediately following a black area, the spot size of the beam grows concurrently with the increase in the luminance signal. To a television viewer, the overall effect of the growth of the spot size is that, in the case of a white stripe on a black field, for example, the edges of the stripe will appear to be blurred with the white area expanded because of the large spot size and the black area correspondingly reduced. In the case of commercial color television programming, the net effect of spot size variance with luminance transitions is a television image which is less crisp than is desirable. This is particularly true where the picture contains many highlights, in which case the spot size of the scanning electron beam may grow to as large as ¼ inch and completely obscure some video detail.

In an attempt to improve the crispness of television images, the prior art has, for the most part, concentrated on improving the bandwidth of television circuitry, improving electron guns so as to produce electron beams having smaller spot size and including "peaking" circuitry in the luminance channels of the receivers to generate steeper luminance transitions.

Although most commercial television receivers do include video peaking, the peaking may produce overshoots at points of amplitude transitions in the luminance signals. Such overshoots may contribute to a lack of resolution by increasing the magnitude of the luminance transitions and causing an increase in the electron beam size at the peak of the transitions, thereby creating an undesirable degrading effect on the resolution of the displayed image.

The literature does disclose attempts to improve the horizontal resolution capabilities of cathode ray tubes by modulating the scanning velocity of an electron beam so as to give the effect of a crispened television image. Examples of such attempts are disclosed in U.S. Pat. Nos. 2,678,964 and 3,830,958, for example. Briefly, one of the methods disclosed therein consists of processing the luminance signal to develop therefrom a control signal which may correspond to a derivative of the luminance signal. The control signal is then used to alter the deflection of the scanning electron beam in a way which causes the scan velocity of the beam to vary in accordance with the control signal. The variance in the scan velocity of the beam can, as will be pointed out below, result in a reproduced video image which has sharper edges, particularly on large black-to-white or white-to-black transitions. The improvement in resolution which might be achieved by this approach to enhancing the edges of TV images, is not, however, considered to be of the degree required to justify the additional expense of implementing this idea in television receivers for consumer use.

The remarks above pointing out how spot size can adversely affect horizontal resolution capability are also applicable to vertical resolution capability. In fact, spot size is perhaps the most important limiting factor in vertical resolution of television CRT's (cathode ray tubes). Since a video signal may be at full amplitude at one point in the picture and at zero amplitude at corresponding points one line above or below that particular point, the system might be said to exhibit infinite bandwidth in the vertical direction. The vertical resolution of television systems is limited, however, by television camera optics, the resolution of the camera tube, and as pointed out above, the spot size of the CRT electron beam. Thus, an edge enhancement system which can counter the effect of large spot size to improve both vertical and horizontal resolution would be a distinct improvement in the presentation of television images.

Finally, a television receiver employing an image edge enhancement system would probably not require the type of peaking presently found in most commercial receivers. As pointed out above, peaking can contribute to the growth of spot size when large amplitude video transitions occur. Therefore, if peaking is to be employed in a receiver in which image edge enhancement techniques are used, the peaking should be optimized to avoid generating large amplitude peaking components which would tend to counter the effects of the edge enhancement system.

Thus, although the concept of image edge enhancement is old, particularly the concept of varying the scan velocity of a CRT electron beam to increase the sharpness or crispness of displayed video images, the concept has not, up until now, been embodied in a television receiver in a way which fully exploits its possibilities. A television receiver which takes full advantage of the possibilities inherent in scan velocity modulation to sharpen the vertical edges of television images, particularly along with an edge enhancement system for improving the sharpness of horizontal edges, and along with a video peaking system which complements image edge enhancement, would be a great improvement over present commercially available television receivers.

PRIOR ART

The following references are noted, each of which is related to improving the sharpness of television images:
U.S. Pat. Nos. 2,182,326; 2,227,630; 2,678,388; 2,678,389; 2,678,964; 3,752,916; 3,804,980; and 3,830,958; and a publication entitled "25v Inch 114 Degree TRINITRON Color Picture Tube and Associated New Developments" which appeared in the August, 1974 issue of the *IEEE Transactions on Broadcast and Television Receivers*.

OBJECTS OF THE INVENTION

It is an object of this invention to provide method and apparatus for enhancing the sharpness of television images.

It is a more specific object of this invention to provide an image edge enhancement scheme which modulates the scan velocity of a CRT electron beam in a way which compensates for large electron beam spot sizes so as to improve the sharpness of the vertical edges of television images.

It is another object of this invention to provide an image edge enhancement scheme which improves the sharpness of the horizontal edges of television images.

It is a further object of this invention to provide a scheme for peaking television video signals which improves the sharpness of television images and which complements the other edge enhancement schemes of this invention.

BRIEF DESCRIPTION OF THE DRAWINGS

The features of this invention which are believed to be novel are set forth with particularity in the appended claims. The invention, together with further objects and advantages thereof, may best be understood, however, by reference to the following description taken in conjunction with the accompanying drawings in which:

FIGS. 1–5 show illustrative waveforms useful in describing the invention;

FIG. 6 is a graph illustrating how the scan velocity of a CRT electron beam is modulated in accordance with one aspect of this invention;

FIG. 7 is a schematic drawing of a vertical edge enhancement system in accordance with this invention;

FIGS. 8 and 9 are views which show the neck portion of a cathode ray tube of FIG. 7 in greater detail;

FIG. 10 is a view of a color cathode ray tube useful in implementing this invention;

FIGS. 11 and 12 are detailed views of the electron gun shown in FIG. 10 and auxiliary deflection plates for deflecting an electron beam in accordance with this invention;

FIG. 13 is a block diagram of a vertical edge enhancement system in accordance with this invention along with several illustrative waveforms;

FIG. 14 is a schematic diagram of the FIG. 13 system;

FIG. 15 shows a pair of waveforms useful in explaining an aspect of this invention;

FIG. 16 illustrates a correction signal generated in accordance with this invention for modulating the scan velocity of a CRT electron beam;

FIGS. 17 and 18 illustrate alternate embodiments of a video peaking scheme in accordance with this invention which are compatible with the edge enhancement schemes disclosed herein;

DESCRIPTION OF THE PREFERRED EMBODIMENT

Figure 19:
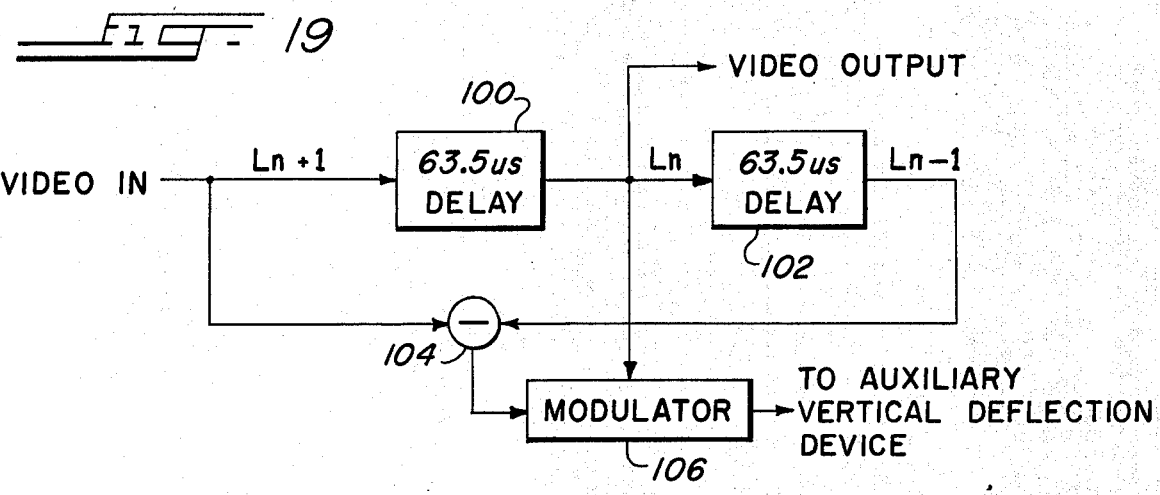
FIG. 19 is a block diagram of an edge enhancement system in accordance with this invention for enhancing the sharpness of horizontal edges of a television image.

In order to appreciate how this invention improves the sharpness of television images, a brief discussion of why such images are degraded by large electron beam spot sizes will be undertaken.

Referring to FIG. 1, there is shown a typical video waveform 20 which is applied to the electron gun of a CRT in order to intensity modulate the CRT electron beam. In this case, the illustrated waveform increases in amplitude from a black level to a white level and then undergoes a second transition where it returns to the black level. A series of such waveforms corresponds to a television image consisting of a white dot or stripe on a black background.

The "rise time" of a video waveform such as waveform 20 is an important factor which influences the sharpness of the television image, and is defined herein as the time required for the waveform to go from an initial amplitude to a final amplitude. It is often desirable that the rise time of a video waveform be as short as possible so that the sharpness of the television image which is derived from that waveform will be maximized. In most color television receivers, "peaking" circuits are employed to improve the rise time of the video waveforms. Such circuits are well known in the television art and will not be discussed in detail herein. Examples of peaking circuits for television receivers can be found in an article entitled "A New Technique for Improving the Sharpness of Television Pictures", appearing in the October, 1951 *Proceedings of the IRE*.

An example of what the FIG. 1 waveform might look like after peaking is shown in FIG. 2. Note that not only has the rise time been improved (shortened), but the peaked waveform contains both a "preshoot" 22 and an "overshoot" 24, both of which are intended to aid in crispening the television image.

Although the FIG. 2 waveform does appear as a sharper television image than the FIG. 1 waveform, overshoot 24 tends to counteract the effects of the peaking because it extends beyond the white level and causes the electron beam spot size to increase more than it would have for the unpeaked waveform of FIG. 1. How an increasing spot size tends to counteract the effects of peaking will now be discussed.

Referring to FIG. 3, there is shown in dashed lines what an idealized version of the FIG. 1 waveform might appear as. Note that the black-to-white transition occurs at midpoint A of the black-to-white transition of the FIG. 1 waveform. Superimposed on the FIG. 3 waveform are solid circles 26 which indicate the relative size of the electron beam spot for various corresponding amplitudes of the FIG. 3 waveform. When the FIG. 3 waveform is at black level and constant, the electron beam spot size is very small and also constant. When the black-to-white transition occurs, the CRT electron gun is driven harder and the electron beam current increases. Since an increase in electron beam current is accompanied by an increase in the electron beam spot size, the spot size of the electron beam increases as the FIG. 3 waveform makes the transition between the black level and the white level. Note that, even though we are beginning with an idealized waveform as shown in FIG. 3, the growth of the electron beam spot size causes the left edge of the growing beam spot to move toward the left so as to cause the black-to-white transition as seen by the viewer to appear to be broad and somewhat indefinite. Thus, even for a video waveform having a sharp transition, the effect of the growing spot size at the transition point is to cause a blurring of the visible edge of the television image. Therefore, when a video waveform, such as that shown in FIG. 1, is peaked to arrive at a waveform such as that shown in FIG. 2, the overshoot 24 will cause the electron beam spot size to continue to grow even more and expand the visible video transition so as to increase the blurring effects at the transition point. This is how an enlarged electron beam spot size may counteract the effects of peaking when overshoots are permitted to exist in the video waveform.

According to one aspect of this invention, the undesirable effects of a growing electron beam spot size can be compensated for and the sharpness of a television image greatly improved, by modulating the scanning velocity of the CRT electron beam such that, when a video amplitude transition occurs, the beam is deflected in the direction of normal scan at a rate which corresponds to the rate of change in the size of the diameter of the spot so as to substantially arrest the trailing edge of the spot in the case of the video amplitude transition which causes an increase in spot size. In the case of a video amplitude transition which causes a decrease in spot size, the leading edge of the spot is arrested.

This aspect of the invention is illustrated in FIG. 4 where circles 28 represent the CRT electron beam spot. As in FIG. 3, the spot size varies in accordance with variations of the amplitude of the video waveform. Although the electron beam spot of FIG. 4 grows large at the black-to-white transition of the video waveform, this transition will appear to be sharp in the reproduced television image of the FIG. 4 waveform because of the fact that the beam spot edge has been arrested or fixed to the transition edge rather than being free to expand both to the left and to the right as in FIG. 3. With the trailing edges of the electron beam spot fixed to the black-to-white transition edge and the leading edge of the electron beam spot fixed to the white-to-black transition edge, both edges will appear to be much sharper than the corresponding edges which would be reproduced by an electron beam spot which is free to move as in FIG. 3.

In order to arrest the edges of the electron beam spot as illustrated in FIG. 4, the center of the electron beam must scan the television screen at a speed which permits the center of the beam to move in the direction of the scan a distance which causes the beam edge to remain fixed. For example, when a black-to-white transition edge occurs in a video waveform and the diameter of the elctron beam spot increases from $d_1$ to $d_2$ (see FIG. 4) during an interval $\Delta t$ where $\Delta t$ corresponds to the interval during which the transition occurs, the center of the electron beam spot should be deflected a distance equal to $$\frac{d_2-d_1}{2}$$

during the interval $\Delta t$.

The edge arrest scheme discussed immediately above is, in a preferred embodiment of this invention, combined with additional electron beam velocity modulation techniques to cause remarkably sharp transition edges to appear in a television image. In the case of a television receiver having an electron beam which is caused to scan a phosphor screen at a nominal velocity $v_1$ in line-by-line fashion, the method to be described immediately below will cause a very sharp transition edge to occur at a predetermined position on the CRT screen, which position corresponds approximately to the position at which the midregion of the unenhanced transition would occur. Preferably the enhanced transition edge will occur at a point on the television screen which corresponds to the position at which point A of the FIG. 1 waveform would normally appear.

According to this aspect of the invention, a black-to-white transition edge is further enhanced by increasing the scan velocity of the electron beam above its nominal scan velocity $v_1$ prior to a video amplitude transition which causes an increase in spot size so as to cause the beam spot to jump ahead to a position where the sharp enhanced transition edge is to be established. Referring to FIG. 4, this means that the electron beam scan velocity is increased so as to cause the beam spot to jump from a position which corresponds approximately to point B of FIG. 4 to point C of FIG. 4. This places the electron beam at the location on the television screen where the enhanced transition edge is to be established. Then, the electron beam is deflected in the direction of normal scan at a rate which corresponds to the rate of growth of the diameter of the electron beam spot so as to substantially arrest the trailing edge of the spot as described above.

When the spot size of the beam substantially ceases to grow, such as at point D of FIG. 4, the scan velocity of the electron beam is reduced to hold the center of the electron beam spot stationary for an interval which corresponds to the total time thus gained over a beam travelling at a uniform velocity $v_1$. In other words, holding the beam at position D compensates for the time gained in the electron beam spot jump from position B to position C. Since the beam is held substantially stationary for that interval, the brightness of the transition edge is increased and thereby made to appear even sharper. Holding the beam stationary at location D will be referred to herein as spot arresting.

The concepts of causing the electron beam to jump, edge arresting the beam and spot arresting the beam will now be illustrated in a somewhat different form with reference to FIGS. 5 and 6. The solid line of FIG. 5 illustrates a typical video waveform having a rise time of 100 microseconds, for example. The dashed line which is superimposed upon the solid line waveform illustrates an idealized form thereof. Points A, B, C, D, E and F of FIG. 5 are points on the waveform which correspond to like points on the television raster; that is, when the FIG. 5 waveform is at point B, the television image which represents point B of the FIG. 5 waveform will be at location B on the television screen.

FIG. 6 illustrates when and where the beam jumping, edge arresting and spot arresting occur with respect to distance X across the television raster. At $t_1$, the electron beam is caused to jump ahead from location A to location B on the television raster, locations which correspond to points A and B of the FIG. 5 waveform. At $t_2$, after the electron beam arrives at point B, corresponding preferably to the mid-region of the black-to-white transition, the edge arrest scheme goes into effect. This scheme continues until $t_3$, which corresponds to location C on the television screen and point C on the FIG. 5 waveform. In the case shown here, the slope $dx/dt$ between $t_2$ and $t_3$ is nearly identical to the slope of line 30 whose slope corresponds to the nominal scan velocity of the electron beam. The slope of the line between $t_2$ and $t_3$ will, of course, depend upon the rate of growth of the electron beam spot for a particular CRT. For the case illustrated in FIG. 6, the size of the electron beam spot grows approximately linearly with increasing beam current.

At time $t_3$, the electron beam spot has grown as large as it will for the particular amplitude transition. The beam spot is then caused to remain stationary until $t_4$.

For the white-to-black transition, which corresponds to points D, E and F of FIG. 6, the process is reversed. That is, from $t_5$ to $t_6$ the electron beam spot is held stationary (spot arrest). At $t_6$ the electron beam spot is edge arrested on the television screen so that the leading edge of the spot remains stationary at a location on the screen which corresponds to point E of the FIG. 5 waveform. When the transition has been completed, corresponding to $t_7$, the beam is caused to jump ahead to position F on the television screen to make up the time lost by holding the beam stationary between $t_5$ and $t_6$. At time $t_8$, when the video transition has been completed, the nominal scan velocity $v_1$ is resumed.

A system which incorporates the concepts set forth above will now be described in connection with the schematic diagram of FIG. 7. The details of the FIG. 7 system will then be more thoroughly discussed.

The edge enhancement system shown in FIG. 7 includes a cathode ray tube 32 having a front panel 34 on which a phosphor screen (not shown) is deposited, a funnel section 36 which mates with front panel 34 and which terminates in a neck portion 38. An electron gun (not shown in FIG. 7) is positioned in neck portion 38 for generating three electron beams. Deflection yoke 40 is positioned on the neck portion of tube 32 for causing the three electron beams to scan the phosphor screen at a nominal velocity $v_1$.

Television video signal source 42 supplies a television video signal to circuit means 44 which comprises the edge enhancement circuitry for developing a control signal to increase the scan velocity of the electron beam above $v_1$ prior to a video amplitude transition so as to cause the beam spot to jump ahead to a position where the sharp transition edge is to be established. The control signal developed by the edge enhancement circuitry also deflects the CRT electron beam in the direction of normal scan at a rate which corresponds to the rate of growth of the diameter of the spot size so as to edge arrest the electron beam spot.

The control signal developed by the edge enhancement circuitry is conducted to a pair of auxiliary deflection plates situated within neck portion 38 of the cathode ray tube by AC coupling the control signal through the neck of tube 32 in a manner to be described below.

Element 46, situated on neck portion 38 of the cathode ray tube, is an external conductive coating which forms one plate of a capacitor for coupling the control signal through the neck of the tube.

Referring now to FIGS. 8 and 9, the means by which the control signal is coupled through the neck portion of the cathode ray tube is shown in more detail. The control signal is fed to conductive coating 46 at contact point 48. A similar inner conductive coating 50 is situated on the inside of neck portion 38, with the glass 52 of neck portion 38 forming an insulator between coatings 46 and 50. A capacitor is thus formed for coupling the control signal through the neck of the tube. As shown in FIG. 8, a preferred embodiment of this system has a pair of outer conductive coatings 46 and inner conductive coatings 50 to form a corresponding pair of capacitors. Another inner conductive coating 53 covers the inside of neck 38 and funnel section 36 (FIG. 7). Coating 52 is the usual dark graphite coating found in color CRT's for conducting the high anode voltage from the CRT screen to the electron gun. As shown in FIG. 8, coating 53 should be spaced from coatings 50 in order to prevent the control signal from being conducted to an AC signal ground through coating 53.

Although one set of coatings is sufficient for coupling the signal through the neck, it is desirable to use a pair of such coatings when a pair of auxiliary deflection plates (as will be described below) are used to deflect the electron beam with a push-pull control signal.

Referring now to FIG. 10, another view of cathode ray tube 32 is shown which depicts the manner in which a pair of metal auxiliary deflection plates 54 are mounted within the neck of the tube. Plates 54 are mounted on the end of a conventional electron gun 56, the details of which are well known in the art and form no part of this invention.

The control signal which is coupled through the neck of the CRT via outer conductive coating 46 and inner conductive coating 50 is coupled to auxiliary deflection plates 54 via a pair of snubber springs 58, each of which have one end rigidly attached to an auxiliary deflection plate 54 and the other end spring-biased against inner conductive coating 50 (not shown in FIG. 10).

Details of the structure and mounting arrangement of auxiliary deflection plates 54 are illustrated in FIGS. 11 and 12.

Referring first to FIG. 11, note that plates 54 are spaced from convergence assembly 60 by rigid connectors 62, each of which includes a glass head 64 to insulate convergence assembly 60 from the AC signal present on deflection plates 54. A high value resistor 68 is also connected between each auxiliary deflection plate 54 and convergence assembly 60. Resistor 68 permits a dc level to be established at deflection plates 54 equal to that present on convergence assembly 60 without coupling any significant portion of the AC control signal to ground through the convergence assembly.

Convergence assembly 60 typically has three snubber springs 66 which connect the convergence assembly to conductive coating 53. As shown in FIG. 11, one of snubber springs 66 points toward the rear of electron gun 56 so as not to contact inner conductive coating 50 through which the control signal is coupled.

As shown in FIG. 11, each deflection plate 54 is serrated to reduce eddy currents induced by the yoke field which could otherwise contribute to a lack of convergence. FIG. 12 illustrates the orientation of deflection plates 54 with respect to other components of electron gun 56. Note that the ends of each deflection plate 54 are bent inwardly in order to maintain a uniform field across the space between them. As shown, convergence assembly 60 has three apertures 70 through which electron beams are directed. The convergence assembly is sectioned by the customary magnetic shields 72 which shield each electron beam from undesired magnetic influences.

Auxiliary deflection plates 54 may also be constructed without serrations provided that they are made of a material which is not so conductive as to short out part of the horizontal deflection field. For example, plates constructed of tin oxide on glass or AQUADAG on glass are suitable.

Returning now to an explanation of the edge enhancement system components shown in FIG. 7, video source 42 is preferably a low impedance source of the television video signal which may be taken from the video processing section of a television receiver following the video detector stage.

The edge enhancement circuitry for generating the control signal, corresponding to block 44 of FIG. 7, is shown in block diagram form in FIG. 13. The input to the edge enhancement circuitry is called the Y or luminance signal, a typical waveform of which is also shown in FIG. 13. The Y signal is applied to delay line 74, which has a typical delay of 100 nanoseconds, and to difference amplifier 75. The output of delay line 74 is referred to as the $y_1$ signal, shown also in FIG. 13. The delayed luminance signal, $y_1$, is sent to one or more video amplifiers (not shown) for amplification and for application to the CRT electron gun to intensity modulate the electron beam.

The $y$ and $y_1$ signals are inputs to difference amplifier 75. Difference amplifier 75 has an output $y_2$ which consists of the algebraic difference $y_1-y$. See waveform $y_2$ of FIG. 13. The $y_2$ signal is applied to positive integrator 76, negative integrator 77 and delay line 78.

Positive integrator 76 is an integrator which is sensitive only to amplitude variations in the $y_2$ signal which have a positive polarity. Negative polarity amplitude variations in the $y_2$ signal are not processed by positive integrator 76.

Negative integrator 77 is similar to positive integrator 76 except that it responds only to amplitude variations in the $y_2$ signal which are of a negative polarity.

The output of positive integrator 76 is designated $y_3$, shown illustratively in FIG. 13. Negative integrator 77 has an output $y_3'$, also shown in FIG. 13.

The output of delay line 78 is applied to integrator 79 to generate a signal designated as $y_3''$ also illustrated in FIG. 13. Signals $y_3$, $y_3'$ and $y_3''$ are inputs to adder 80 which generates a correction signal $y_4$ consisting of the algebraic sum of its inputs. Signal $Y_4$ is then applied to push-pull amplifier 82 which amplifies $Y_4$ and applies it to a pair of auxiliary deflection plates within the neck of the CRT.

The operation of the edge enhancement system shown in FIG. 13 is as follows. Prior to the video signal $Y_1$ making a black-to-white transition, correction signal $Y_4$ has a component A (see waveform $Y_4$ of FIG. 13) which, when applied to the auxiliary deflection plates, causes the electron beam to jump ahead to a position where a sharp transition edge is to be established. When the black-to-white transition occurs in the $y_1$ signal, the $y_4$ correction signal has a component B which causes the electron beam spot to be edge arrested in the manner described above. After the black-to-white transition has terminated, a component C of correction signal $y_4$ effects a spot arrest condition for the electron beam.

For the white-to-black transition, correction signal $y_4$ has components D, E and F which cause the electron beam to be spot arrested, edge arrested and jumped ahead respectively.

The waveforms shown in FIG. 13 are drawn with the assumption that the video amplifiers have a rise time of 150 nanoseconds and the size of the electron spot is 120 mils in diameter. The 100 nanoseconds delay associated with delay lines 74 and 78 is chosen to provide sufficient time to reposition the beam before the video signal $y_1$ begins to change amplitude significantly. The delay time required is a function of the response of the video amplifier. The amount of correction required is a function of the CRT electron beam spot size. The amplitude of the control signal delivered to the auxiliary deflection plates is approximately 120 volts peak to peak.

FIG. 13 also illustrates how the edge enhancement circuitry produces a corrected display which is narrower than an uncorrected display. Since, for the corrected display, the outer edges of the beam spot are fixed to the transition edges rather than being free to expand and thereby blur the image edges, an image that is corrected in accordance with this invention will have narrower white images which more clearly correspond to the intended images and which are more distinct.

Images corrected in accordance with this invention also have edges which are brighter than the edges of uncorrected images and thus appear to stand out even more. This increased enhancement of image edges is caused by the fact that the electron beam is caused to jump ahead prior to a video amplitude transition so that the electron beam spends less time at that portion of the screen which preceeds the video amplitude transition and therefore causes that portion of the screen to appear to be somewhat darker. To compensate for this gain in time, the electron beam spot is arrested at a point on the screen which corresponds to the video amplitude transition and thus increases the brightness of the image edge.

Referring now to FIG. 14, a circuit diagram of the edge enhancement circuitry of FIG. 13 is shown. The reference numerals which appear in FIG. 14 identify elements or groups of elements which correspond to like-numbered elements of FIG. 13. The points at which the various signals appear have been labelled $y$, $y_1$, etc. to correspond to the signals found at corresponding locations in FIG. 13. Since the circuitry is relatively simple, no additional explanation is deemed necessary for an understanding how the FIG. 14 system performs.

The discussion up until now has pointed out a preferred method and apparatus for improving the sharpness of the vertical edges of television images by causing the electron beam spot to jump ahead prior to a video transition, edge arresting the beam spot, and spot arresting the beam spot. Of course, the suggested implementation is only illustrative of the ways in which this invention can be carried out. For purposes of generality, the mathematics which provide the guidelines for building an edge enhancement system in accordance with this invention will now be briefly discussed. By using the guidelines which will be set forth immediately below, one may generate the required auxiliary deflection voltages for modulating the scan velocity of a CRT electron beam in accordance with this invention.

Recall that the auxiliary deflection field for a black-to-white transition must cause the electron beam to jump to the right prior to the transition, maintain a stationary left edge during the transition rise, and then cause the spot to remain stationary for an interval. For a white-to-black transition the sequence is reversed: first spot arrest, right edge arrest the spot during the decay of the spot size, and then a jump to the right.

Consider the waveforms of FIG. 15. Waveform 84 is a conventional undelayed video waveform and waveform 86 is a delayed version of waveform 84. Since the edge enhancement scheme described herein requires, according to one aspect of this invention, the electron beam spot to jump ahead prior to a black-to-white transition in the video signal, a delayed and undelayed version of the video signal is needed to determine when such a jump is required. Waveforms 84 and 86 are illustrative of the required signals.

At time $t_0$, the non-delayed video signal begins to rise. At time $t_1$, the rise is completed and the rise of the delayed video begins. During the period $t_0-t_1$, prior to the rise of the delayed signal, the spot is rapidly moved (jumped) to a position where its left edge is aligned with the desired location of a sharp image edge. The required displacement of the center of the spot is $$v(t_2-t_0) + D_1/2$$

where $v$ is the nominal scan velocity, $D_1$ is the diameter of the beam at low current levels, and $t_2$ is the instant when the midregion of the black-to-white transition would be normally scanned by an electron beam travelling at its nominal velocity.

The beam will be moved by the main deflection field an amount equal to $$v(t_1-t_0)$$

during this period. Hence, the auxiliary deflection field must move the beam an amount $J$ where $$J = v(t_2-t_0) + D_1/2 - v(t_1-t_0)$$

$$J = v(t_2-t_1) + D_1/2$$

The first portion of the control signal for creating the auxiliary deflection field during the period from $t_0$ to $t_1$ thus has amplitude proportional to $J$.

During the period when the beam current increases, from $t_1$ to $t_3$, the electron beam spot increases from its original diameter $D_1$ to a larger diameter $D_2$. In order to hold the left edge of the spot fixed during this period, the center of the spot must move a distance $$\frac{D_2 - D_1}{2}.$$

Normally the spot center would move a distance $v(t_3-t_1)$ during this period due to the main deflection field. Hence, the required auxiliary incremental deflection $E$ during this period is $$E = \frac{D_2 - D_1}{2} v(t_3-t_1).$$

The edge arrest portion of the control signal waveform should thus have a slope proportional to $$E/t_3-t_1.$$

It should be noted that for large, rapid beam growth, $E$ is a positive quantity; for small, slow growth, it is negative (auxiliary deflection is to the left).

The first two portions of the control signal waveform move the beam center an amount equal to $J + E$ or $$J + E = v(t_2-t_1) + D_0/2 + \frac{D_2-D_1}{2} v(t_3-t_1)$$

$$= \frac{D_2}{2} v(t_3-t_2).$$

The auxiliary deflection field should not be made to decay at a rate faster than the main scan rate or the beam will move to the left. This would cause deterioration in the sharpness of the bright edge and a displacement of the beam to the left into a darker area. Hence, the auxiliary field decay period must be at least $$t_4-t_3 \geq \frac{J+E}{v} = \frac{D_2}{2V}(t_3-t_2).$$

If the decay takes place uniformly during this period, the spot will remain stationary.

In a period such as that from $t_6$ to $t_8$ when the electron beam current is decreasing, the right side edge arrest control waveform has the amplitude $$E' = \frac{D_2-D_1}{2} v(t_8-t_6)$$

which is identical to the expression for left edge arrest signal $E$ except that the times $t_8$ and $t_6$ replace $t_3$ and $t_1$.

Similarly, the white-to-black transition jump has a magnitude $$J' = v(t_9-t_8) + D_{1/2}$$

which is equal to $J$ if the transition periods are equal.

During the period from $t_5$ to $t_6$, the electron beam spot is arrested. The same constraints are applied to this period as those applicable to the period from $t_3$ to $t_4$. The magnitude of the control signal during this interval is equal to $-(J+E)$. A diagram of the magnitude of the auxiliary deflection control signal is shown in FIG. 16. The various instants of time labelled $t_0-t_9$ in FIG. 16 correspond to the similarly labelled instants of time in FIG. 15.

In accordance with another aspect of this invention, image edge enhancement is combined with a compatible video peaking scheme so as to peak the video signal without causing excessive spot size growth of the electron beam while at the same time enhancing the vertical edges of images to compensate for large electron beam spot sizes which are generated by large amplitude video transitions.

Generally, the compatible peaking scheme comprises peaking smaller amplitude video signals relatively more than large amplitude video signals to preserve the improvement in image sharpness which is attributable to the shorter rise times of peaked signals without generating the large overshoots on high amplitude video signals which cause excessive beam spot growth and the resultant blurring of image edges.

The image edge enhancement which is preferably employed with the above described compatible peaking includes increasing the scan velocity of the electron beam above its nominal velocity prior to a video amplitude transition so as to cause the beam to jump ahead to a position where a sharp transition edge is to be established, reducing the scan velocity when the beam arrives at the position where the sharp transition edge is to be established, and resuming the nominal scan velocity of the beam after the video amplitude transition has passed.

Referring now to FIG. 17, there is shown a scheme for implementing the compatible video peaking described above. As shown, a video signal is applied to compression amplifier 88 which non-linearly amplifies the video signal such that the large amplitude components of the signal are amplified to a lesser extent than the small amplitude components. Compression amplifier 88 produces a compressed video signal which is applied to high pass peaking circuit 90 which generates high frequency peaking components. These peaking components are applied, along with the input video signal, to adder 92 which adds its inputs to generate a selectively peaked video signal having large amplitude components which are peaked relatively less than the small amplitude components.

Peaking circuit 90 is of conventional design and may include, for example, one of the simple RC peaking circuits which are well known in the art. Compression amplifier 88 may also be of any conventional design.

An alternate scheme for generating a selectively peaked video signal according to this invention is shown in FIG. 18. In this case, the video signal is applied first to a high pass peaking circuit 94 to generate the high frequency peaking components. The peaking components are then applied to compression amplifier 96 which non-linearly amplifies the peaking components such that large amplitude peaking components are amplified to a lesser extent than small amplitude peaking components. The output of compression amplifier 96 is a compressed peaking signal which, along with the video input signal, is applied to adder 98 to produce a selectively peaked video signal.

Either of the peaking schemes shown in FIGS. 17 and 18 may be combined with the edge enhancement scheme shown in FIG. 13, for example, to achieve the desired compatible peaking with enhancement of the vertical edges of television images.

It has already been pointed out that the vertical resolution of a cathode ray tube is limited by the spot size of the electron beam. However, this effect can be overcome to a large extent by the use of auxiliary vertical scan modulation of the electron beam in accordance with another aspect of this invention.

The space allotted to one scan line is about .036 inch in a 25 inch CRT. If the beam diameter is larger than this, loss of resolution can occur. However, the effects of a large beam diameter may be compensated for by moving the beam spot vertically away from an adjacent region of low brightness.

If a given portion of a television scan line is of high intensity while the region directly above it is of low intensity, downward movement of the beam spot is called for to insure that the high intensity region does not overlap the low intensity region and thereby blur the transition between the two regions. Obviously, if the succeeding scan line should also be darker, a downward motion of the electron beam spot would help the upper low intensity region, but would deteriorate the region in the succeeding line. Hence, prior and subsequent line signal information is required to determine the correct auxiliary deflection. A scheme for generating a vertical deflection correction signal which will sample the information contained in prior and subsequent scan lines is shown in FIG. 19.

As shown, the video signal is applied to a delay device 100 which delays the video signal one horizontal line time, or approximately 63.5 microseconds. The signal which is present at the input to delay device 100 at any given instant of time is designated as $L_{n+1}$.

The output of delay device 100 is applied to the electron gun of the CRT and to delay device 102 which again delays the video signal by one horizontal line time. The signal which is present at the input to delay device 102 is designated $L_n$ while the signal which is simultaneously present at the output of delay device 102 is designated $L_{n-1}$.

The output of delay device 102 and the video input signal are applied to subtractor 104 whose output is algebraically equal to $L_{n+1}-L_{n-1}$.

Modulator 106 receives the output of subtractor 104 and the output of delay device 100 and modulates the first delayed video signal ($L_n$) by the difference signal ($L_{n+1}-L_{n-1}$) to obtain a correction signal which is representative of the product of the first delayed video signal and the difference signal.

The correction signal generated by modulator 106 is then applied to an auxiliary deflection device (not shown) for vertically deflecting the electron beam by an amount and in a direction corresponding to the amplitude and polarity, respectively, of the correction signal so as to enhance the horizontal edges of the television image.

Figure 20:
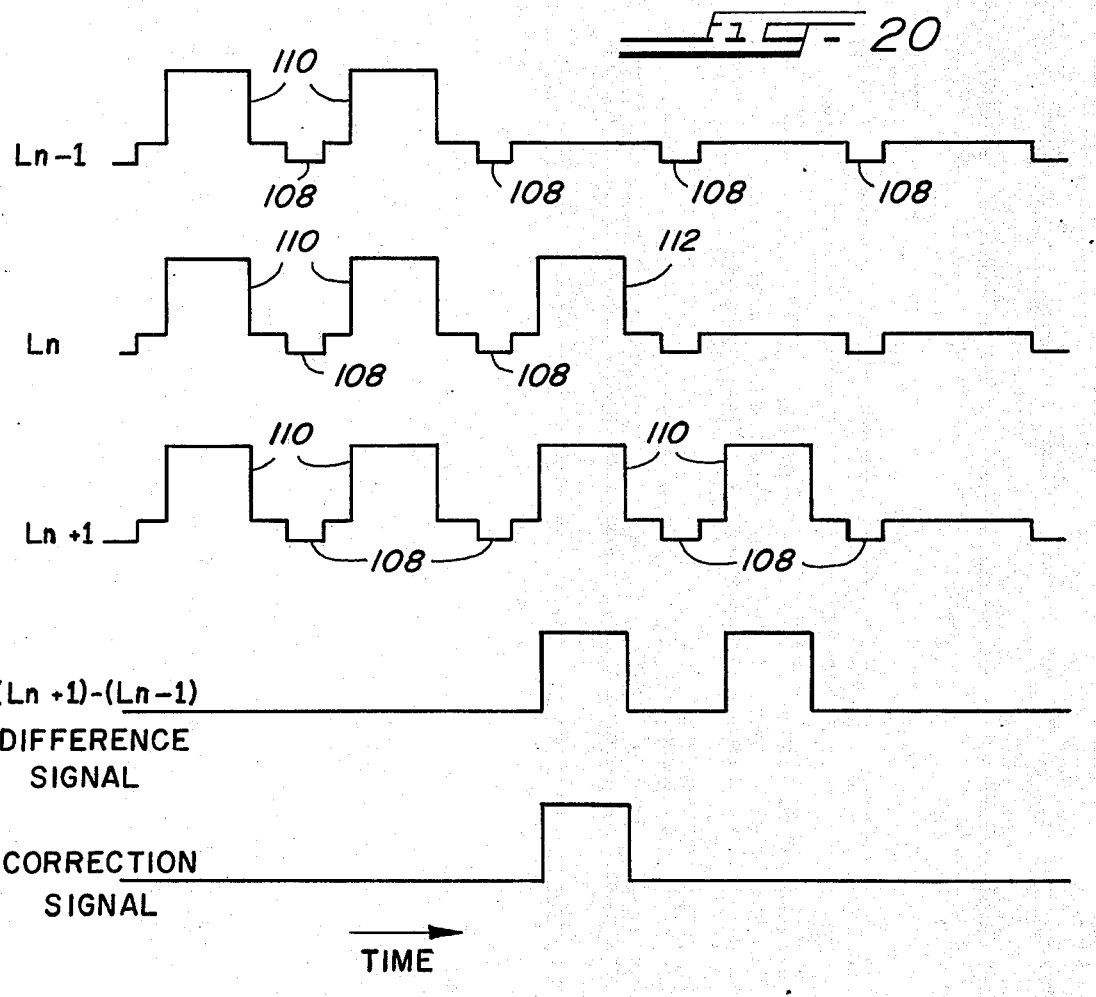
FIG. 20 shows a number of illustrative waveforms useful in explaining the operation of the FIG. 19 system.

The operation of the FIG. 19 system, particularly the operation of modulator 106, is shown graphically in FIG. 20.

Signal $L_{n+1}$ is shown in FIG. 20 as a series of scan lines, each of which includes a horizontal sync component 108. The first four scan lines of signal $L_{n+1}$ also includes a video component 110 which corresponds to a white image on a black background. The last scan line of the $L_{n+1}$ signal contains only a horizontal sync component 108. The video information contained therein is a constant black level.

Signal $L_n$ is delayed one horizontal line time from signal $L_{n+1}$. This means that the $L_n$ signal will be a duplicate of the $L_{n+1}$ signal except that it will be moved to the left in FIG. 20 an interval equal to one horizontal line time. Signal $L_{n-1}$ is delayed an additional 63.5 microseconds and is moved two horizontal line times to the left.

When the signals designated $L_{n+1}$ and $L_{n-1}$ in FIG. 20 are applied to subtractor 104, a difference signal is generated as shown in FIG. 20 and designated as $L_{n+1}-L_{n-1}$.

When the difference signal and the $L_n$ signal are applied to modulator 106, the output is as shown in FIG. 20 and is designated as the correction signal. Note that where either signal $L_n$ or the difference signal are equal to zero, the correction signal also equals zero. When the difference signal and the $L_n$ signal each have non-zero values, there will be an output from modulator 106, the amplitude of which is related to the amplitude of its inputs. The polarity of the correction signal is likewise dependent on the polarity of the $L_n$ signal and the difference signal. Specifically, modulator 106 responds to the polarities of its inputs as does a conventional four-quadrant multiplier.

When the correction signal shown in FIG. 20 is applied to an auxiliary vertical deflection device, the electron beam will be moved upward. This causes a high brightness region of the $L_n$ signal, designated as 112 in FIG. 20, to be moved upward and away from the dark region which will appear immediately beneath it in the next scan line.

Thus far, this invention has been described as covering three main topics; namely, the enhancement of vertical edges of a television image, the enhancement of horizontal edges, and video peaking compatible with the described methods of edge enhancement. Obviously, a television receiver may incorporate any one of the three described improvements to increase the sharpness of its reproduced images. Alternately, any two, or preferably all three, improvements may be incorporated in a television receiver to provide a full range of improved edge enhancement. This may be accomplished, for example, by combining the structures illustrated in FIGS. 10, 14, 17 and 19. Since the way in which the illustrated structures may be combined is considered obvious, no figures have been included to illustrate the several possible combinations. It is also evident that many variations in the illustrative embodiments which have been shown will be apparent to those skilled in the art. Accordingly, this invention is intended to embrace all such variations which fall in the spirit and scope of the invention as defined by the appended claims.

What is claimed is:

1. A method of enhancing the edges of video images displayed on a cathode ray tube having electron gun means for generating at least one electron beam which is caused to scan a phosphor screen in line-by-line fashion at a predetermined nominal scan velocity and which has a spot size at the screen which grows with increasing beam current, said method comprising modulating the scanning velocity of said electron beam such that, when a video amplitude transition occurs, the beam is deflected in the direction of normal scan at a rate which corresponds to the rate of change in the size of the diameter of the spot for substantially the entire duration of said transition so as to substantially arrest the trailing edge of the spot in the case of a video amplitude transition which causes an increase in spot size, and so as to substantially arrest the leading edge of the spot in the case of a video amplitude transition which causes a decrease in spot size, and thereafter restoring said nominal scan velocity whereby displayed video transitions have better defined edges.

2. A method of enhancing the edges of video images as set forth in claim 1 wherein said video transition occurs during an interval $\Delta t$, wherein the spot size diameter varies between $d_2$ and $d_1$ during the interval $\Delta t$ ($d_2 > d_1$), and wherein the center of the spot is deflected a distance equal to $$\frac{d_2-d_1}{2}$$

during the interval $\Delta t$.

3. A method of enhancing the sharpness of transitions in video images displayed on a cathode ray tube having electron gun means for generating at least one electron beam which is caused to scan a phosphor screen at a nominal velocity $v_1$ in line-by-line fashion and which has a spot size which grows with increasing beam current, said method causing a sharp transition edge to occur at a predetermined position on the screen which corresponds approximately to the position at which the mid-region of the unenhanced transition would occur, comprising:

increasing the scan velocity of the beam above $v_1$ prior to a video amplitude transition so as to cause the beam spot to jump ahead to a position where said sharp transition edge is to be established; and deflecting the beam in the direction of normal scan at a rate which corresponds to the rate of growth of the diameter of the spot size for substantially the entire duration of said transition so as to substantially arrest the trailing edge of the spot during the growth of said spot, thereby causing the displayed transition edge to be sharper than an unenhanced edge.

4. A method of enhancing the edges of video images displayed on a cathode ray tube having electron gun means for generating at least one electron beam which is caused to scan a phosphor screen at a nominal velocity $v_1$ in line-by-line fashion and which has a spot size which grows with increasing beam current, said method causing a sharp transition edge to occur at a position on the screen which corresponds approximately to the position at which the mid-region of the unenhanced transition would occur, comprising:

increasing the scan velocity of the beam above $v_1$ prior to a video amplitude transition which causes an increase in spot size so as to cause the beam spot to jump ahead to a position where said sharp transition edge is to be established;

deflecting the beam in the direction of normal scan at a rate which corresponds to the rate of growth of the diameter of the spot so as to substantially arrest the trailing edge of the spot; and when the spot size substantially ceases to grow, holding the spot center substantially stationary for a predetermined interval.

5. A method of enhancing the edges of video images displayed on a cathode ray tube having electron gun means for generating at least one electron beam which is caused to scan a phosphor screen at a nominal velocity of $v_1$ in line-by-line fashion and which has a spot size which grows with increasing beam current, said method causing a sharp transition edge to occur at a position on the screen which corresponds substantially to the position at which the mid-region of the unenhanced transition would occur, comprising:

increasing the scan velocity of the beam above $v_1$ prior to a video amplitude transition which causes an increase in spot size so as to cause the beam spot to jump ahead to said position where said sharp transition edge is to be established;

deflecting the beam in the direction of normal scan at a rate which corresponds to the rate of growth of the diameter of the spot size so as to substantially arrest the trailing edge of the spot;

when the spot size of the beam substantially ceases to grow, holding the spot center substantially stationary for an interval which corresponds to the total time thus gained over a beam travelling at a uniform velocity $v_1$; and resuming the scan at the nominal velocity $v_1$, thus forming a sharper and brighter edge on each such video amplitude transition.

6. A system for enhancing the edges of video images displayed on a cathode ray tube having electron gun means for generating at least one electron beam which is caused to scan a phosphor screen in line-by-line fashion at a predetermined nominal scan velocity and which has a spot size at the screen which grows with increasing beam current, said system comprising:

means for modulating the scanning velocity of said electron beam such that, when a video amplitude transition occurs, the beam is deflected in the direction of normal scan at a rate which corresponds to the rate of change in the size of the diameter of the spot for substantially the entire duration of said transition so as to substantially arrest the trailing edge of the spot in the case of a video amplitude transition which causes an increase in spot size, and so as to substantially arrest the leading edge of the spot in the case of a video amplitude transition which causes a decrease in spot size;

and means for thereafter restoring said nominal scan velocity whereby the displayed video transition is enhanced.

7. A system of enhancing the edges of video images displayed on a cathode ray tube having electron gun means for generating at least one electron beam which is caused to scan a phosphor screen at a nominal velocity $v_1$ in line-by-line fashion and which has a spot size which grows with increasing beam current, said system causing a sharp transition edge to occur at a position on the screen which corresponds substantially to the position at which the mid-region of the unenhanced transition would occur, comprising:

a video signal source;

means receiving said video signal for increasing the scan velocity of the beam above $v_1$ when a video amplitude transition occurs which causes an increase in spot size so as to cause the beam spot to jump ahead to a position where said sharp transition edge is to be established and for then reducing the scan velocity to deflect the beam in the direction of normal scan at a rate which corresponds to the rate of growth of the diameter of the spot for substantially the entire duration of said transition so as to substantially arrest the trailing edge of the spot, thereby causing the displayed transition edge to be sharper than an unenhanced edge.

8. A system for enhancing the edges of video images displayed on a cathode ray tube having electron gun means for generating at least one electron beam which is caused to scan a phosphor screen at a nominal velocity $v_1$ in line-by-line fashion and which has a spot size which grows with increasing beam current, said system causing a sharp transition edge to occur at a position on the screen which corresponds substantially to the position at which the mid-region of the unenhanced transition would occur, comprising:

a video signal source;

control means receiving said video signal for increasing the scan velocity of the beam above $v_1$ prior to a video amplitude transition which causes an increase in spot size so as to cause the beam spot to jump ahead to a position where said sharp transition edge is to be established and for deflecting the beam in the direction of normal scan at a rate which corresponds to the rate of growth of the diameter of the spot so as to substantially arrest the trailing edge of the spot and, when the spot size substantially ceases to grow, for holding the spot substantially stationary for a predetermined interval so as to increase the brightness of the displayed transition edge.

9. A system for enhancing the edges of video images displayed on a cathode ray tube having electron gun means for generating at least one electron beam which is caused to scan a phosphor screen at a nominal velocity $v_1$ in line-by-line fashion and which has a spot size which grows with increasing beam current, said system causing a sharp transition edge to occur at a position on the screen which corresponds to the position at which the mid-region of the unenhanced transition would occur, comprising:

a video signal source;

means receiving said video signal for increasing the scan velocity of the beam above $v_1$ when a video amplitude transition occurs which causes an increase in spot size so as to cause the beam spot to jump ahead a distance to a position where said sharp transition edge is to be established, and then deflecting the beam in the direction of normal scan at a rate which corresponds to the rate of growth of the diameter of the spot so as to substantially arrest the trailing edge of the spot, and, when the spot size substantially ceases to grow, for holding the spot center substantially stationary for an interval which corresponds to the total time thus gained over a beam travelling at a uniform velocity $v_1$, and for then resuming the scan at the nominal velocity $v_1$, thus forming a sharper and brighter edge on each such video amplitude transition.

10. A system for enhancing, on a cathode ray tube screen, the edges of video images where video amplitude transitions occur, said system causing a sharp transition edge to occur at a position on the screen which corresponds substantially to the position at which the mid-region of the unenhanced transition would occur, comprising:

a cathode ray tube having a front panel on which a phosphor screen is deposited, a funnel section which mates with the front panel and which terminates in a neck portion, electron gun means positioned in the neck portion of the funnel for generating three electron beams and deflection means for causing the beams to scan the phosphor screen at a nominal velocity $v_1$;

a television video signal source;

circuit means receiving the video signal for developing therefrom a control signal to increase the scan velocity of the electron beam above $v_1$ prior to a video amplitude transition which causes an increase in spot size, so as to cause the beam spot to jump ahead to a position where said sharp transition edge is to be established, and to deflect the beam in the direction of normal scan at a rate which corresponds to the rate of growth of the diameter of the spot size so as to substantially arrest the trailing edge of the spot;

a pair of auxiliary deflection plates situated within the neck portion of the cathode ray tube for receiving said control signal and for generating an electric field in response to said control signal, said plates being spaced from each other so as to permit the electron beams to pass between them and being positioned so as to deflect all beams substantially uniformly in the normal direction of the scan so as to vary the scan velocity of the electron beams and enhance the edges of displayed images in accordance with said control signal, and said auxiliary deflection plates being serrated to reduce eddy currents and having end portions which are bent toward the electron beam so as to create a more uniform electric field between said plates; and signal coupling means receiving said control signal for coupling it through the funnel section of the cathode ray tube, said coupling means including at least one external conductive coating on the outer side of the funnel section and a corresponding number of internal conductive coatings on the inside of the funnel section, the respective inner and outer coatings being positioned so as to form at least one capacitor for coupling said control signal from a location outside the funnel section to said internal conductive coatings and further including conductor means for conducting said control signal from said inner conductive coating to said auxiliary deflection plates.

11. For use in a television receiver which converts a video signal to a displayed television image on a cathode ray tube which generates at least one electron beam for scanning a luminescent screen at a nominal velocity $v_1$ in line-by-line fashion, a method of peaking the video signal without causing excessive spot size growth of the cathode ray tube electron beam and of enhancing the vertical edges of video images displayed on the cathode ray tube to compensate for large electron beam spot sizes which are generated by large amplitude video transitions, comprising:

non-linearly amplifying said video signal such that the large amplitude components of the video signal are amplified to a lesser extent than the small amplitude components so as to produce a compressed video signal;

passing said compressed video signal through a high pass peaking circuit to generate high frequency peaking components;

adding the output of said high pass peaking circuit to the video signal to produce a selectively peaked video signal;

applying said selectively peaked video signal to the cathode ray tube to modulate said electron beam;

increasing the scan velocity of the beam above $v_1$ prior to a video amplitude transition so as to cause the beam to jump ahead to a position where a sharp transition edge is to be established;

reducing the scan velocity of the beam from the time when the beam arrives at the position where the sharp transition edge is to be established until the video amplitude transition has passed; and thereafter resuming the nominal scan velocity $v_1$ of the beam, thus providing the cathode ray tube with selectively peaked video signals for producing sharp television images without excessive electron beam spot size growth and also increasing the sharpness of the images thus produced by modulating the electron beam scan velocity to compensate for the blurring effect of spot size growth which is associated with large amplitutde video transitions.

12. For use in a television receiver which converts a video signal to a displayed television image on a cathode ray tube which generates at least one electron beam for scanning a luminescent screen at a nominal velocity $v_1$ in line-by-line fashion, a method of peaking the video signal without causing excessive spot size growth of the cathode ray tube electron beam and of enhancing the vertical edges of video images displayed on the cathode ray tube to compensate for large electron beam spot sizes which are generated by large amplitude video transitions, comprising:

passing said video signal through a high pass peaking circuit for generating high frequency peaking components;

non-linearly amplifying the output of said high pass peaking circuit such that the large amplitude peaking components are amplified to a lesser extent than the small amplitude peaking components to generate a compressed peaking signal;

adding said compressed peaking signal to said video signal to produce a selectively peaked video signal;

applying said selectively peaked video signal to the cathode ray tube to intensity modulate said electron beam;

increasing the scan velocity of the beam above $v_1$ prior to a video amplitude transition so as to cause the beam to jump ahead to a position where a sharp transition edge is to be established;

reducing the scan velocity of the beam from the time when the beam arrives at the position where the sharp transition edge is to be established until the video amplitude transition has passed; and thereafter resuming the nominal scan velocity $v_1$ of the beam, thus providing the cathode ray tube with selectively peaked video signals for producing sharp television images without excessive electron beam spot size growth and also increasing the sharpness of the images thus produced by modulating the electron beam scan velocity to compensate for the blurring effect of spot size growth which is associated with large amplitude video transitions.

13. For use in a television receiver which converts a video signal to a displayed television image on a cathode ray tube which generates at least one electron beam for scanning a luminescent screen at a nominal velocity $v_1$ in line-by-line fashion, a system for peaking the video signal without causing excessive spot size growth of the cathode ray tube electron beam and for enhancing the vertical edges of video images displayed on the cathode ray tube to compensate for large electron beam spot sizes which are generated by large amplitude video transitions, comprising:

circuit means receiving the video signal for non-linearly amplifying the video signal such that the large amplitude components of the video signal are amplified to a lesser extent than the small amplitude components so as to produce a compressed video signal;

a high pass peaking circuit receiving said compressed video signal for generating high frequency peaking components;

means for adding said video signal to said high frequency peaking components to produce a selectively peaked video signal;

means for applying said selectively peaked video signal to the cathode ray tube for modulating the electron beam;

means for increasing the scan velocity of the beam above $v_1$ prior to a video amplitude transition so as to cause the beam to jump ahead to a position where a sharp transition edge is to be established;

means for reducing the scan velocity of the beam from the time when the beam arrives at the position where the sharp transition edge is to be established until the video amplitude transition has passed; and means for thereafter resuming the nominal scan velocity $v_1$ of the beam, thus providing the cathode ray tube with selectively peaked video signals for producing sharp television images without excessive electron beam spot size growth and also increasing the sharpness of the images thus produced by modulating the electron beam scan velocity to compensate for the blurring effect of spot size growth which is associated with large amplitude video transitions.

14. For use in a television receiver which converts a video signal to a displayed televison image on a cathode ray tube which generates at least one electron beam for scanning a luminescent screen at a nominal velocity $v_1$ in line-by-line fashion, a system for peaking the video signal without causing excessive spot size growth of the cathode ray tube electron beam and for enhancing the vertical edges of video images displayed on the cathode ray tube to compensate for large electron beam spot sizes which are generated by large amplitude video transitions, comprising:

a high pass peaking circuit receiving said video signal for developing therefrom high frequency peaking components;

circuit means receiving said high frequency peaking components for non-linearly amplifying said peaking components such that the large amplitude components are amplified to a lesser extent than the small amplitude peaking components to generate a compressed peaking signal;

means for adding the compressed peaking signal to the video signal to produce a selectively peaked video signal;

means for applying said selectively peaked video signal to the cathode ray tube for modulating the electron beam;

means for increasing the scan velocity of the beam above $v_1$ immediately prior to a video amplitude transition so as to cause the beam to jump ahead to a position where a sharp transition edge is to be established;

means for reducing the scan velocity of the beam from the time when the beam arrives at the position where the sharp transition edge is to be established until the video amplitude transition has passed; and means for thereafter resuming the nominal scan velocity $v_1$ of the beam, thus providing the cathode ray tube with selectively peaked video signals for producing sharp televison images without excessive electron beam spot size growth and also increasing the sharpness of the images thus produced by modulating the electron beam scan velocity to compensate for the blurring effect of spot size growth which is associated with large amplitude video transitions.

15. In a televison receiver having a cathode ray tube for converting a video signal to a television image by scanning a luminescent screen with an electron beam modulated by video information, a method of enhancing the sharpness of the horizontal edges in the displayed televison image comprising:

delaying the video signal for an interval equal to one horizontal line time to generate a first delayed video signal;

applying said first delayed video signal to the cathode ray tube to modulate the scanning electron beam;

delaying the first delayed video signal for an interval equal to one horizontal line time to generate a second delayed video signal;

comparing the video signal with said second delayed video signal to generate a difference signal whose amplitude is representative of the amplitude difference between said video signal and said second delayed video signal;

modulating said first delayed video signal by said difference signal to obtain a correction signal representative of the product of said first delayed video signal and said difference signal; and applying said correction signal in synchronism with said first delayed video signal to cathode ray tube deflection means for vertically deflecting the electron beam by an amount and in a direction corresponding to the amplitude and polarity, respectively, of said correction signal so as to enhance the horizontal edges of the television image.

16. In a televison receiver having a cathode ray tube for converting a video signal to a television image by scanning a luminescent screen with an electron beam modulated by video information, a horizontal edge enhancement system for enhancing the sharpness of the horizontal edges in the displayed television image, comprising:

a video signal source;

a first delay means connected to said video signal source for delaying the video signal by one horizontal line time, thus generating a first delayed video signal at the output of said first delay means;

means for applying said first delayed video signal to the cathode ray tube for intensity modulating the scanning electron beam;

a second delay means receiving the first delayed video signal for delaying it an additional one horizontal line time so as to generate a second delayed video signal at the output of said second delay means;

means for comparing the video signal from said video signal source with the output of said second delay means to generate a difference signal whose amplitude is representative of the amplitude differences between said video signal and said second delayed video signal;

means receiving said difference signal and said first delayed video signal for modulating said first delayed video signal by said difference signal to obtain a correction signal representative of the product of said signals; and means for applying said correction signal in synchronism with said first delayed video signal to cathode ray tube deflection means for vertically deflecting the electron beam by an amount and in a direction corresponding to the amplitude and polarity, respectively, of said correction signal so as to enhance the horizontal edges of the television image.

17. In a television receiver having a cathode ray tube for converting a video signal to a television image by scanning a luminescent screen with an electron beam modulated by video information, a method of improving the sharpness of low amplitude video transitions in the video signal and of enhancing the sharpness of the horizontal edges in the displayed television image comprising:

non-linearly amplifying said video signal such that the large amplitude components of the video signal are amplified to a lesser extent than the small amplitude components so as to produce a compressed video signal;

passing said compressed video signal through a high pass peaking circuit to generate high frequency peaking components;

adding the output of said high pass peaking circuit to the video signal to produce a selectively peaked video signal;

applying said selectively peaked video signal to the cathode ray tube to intensity modulate the electron beam;

delaying the video signal for an interval equal to one horizontal line time to generate a first delayed video signal;

applying said first delayed video signal to the cathode ray tube to modulate the scanning electron beam;

delaying the first delayed video signal for an interval equal to one horizontal line time to generate a second delayed video signal;

comparing the video signal with said second delayed video signal to generate a difference signal whose amplitude is representative of the amplitude differences between said video signal and said second delayed video signal;

modulating said first delayed video signal by said difference signal to obtain a correction signal representative of the product of said first delayed video signal and said difference signal; and applying said correction signal in synchronism with said first delayed video signal to the cathode ray tube deflection means for vertically deflecting the electron beam by an amount and in a direction corresponding to the amplitude and polarity, respectively, of said correction signal so as to enhance the horizontal edges of the television image.

18. In a television receiver having a cathode ray tube for converting a video signal to a television image by scanning a luminescent screen with an electron beam modulated by video information, a method of improving the sharpness of low amplitude video transitions in the video signal and of enhancing the sharpness of the horizontal edges in the displayed television image comprising:

passing said video signal through a high pass peaking circuit for generating high frequency peaking components;

non-linearly amplifying the output of said high pass peaking circuit such that the large amplitude peaking components are amplified to a lesser extent than the small amplitude peaking components to generate a compressed peaking signal;

adding said compressed peaking signal to said video signal to produce a selectively peaked video signal;

applying said selectively peaked video signal to the cathode ray tube to intensity modulate said electron beam;

delaying the video signal for an interval equal to one horizontal line time to generate a first delayed video signal;

applying said first delayed video signal to the cathode ray tube to modulate the scanning electron beam;

delaying the first delayed video signal for an interval equal to one horizontal line time to generate a second delayed video signal;

comparing the video signal with said second delayed video signal to generate a difference signal whose amplitude is representative of the amplitude differences between said video signal and said second delayed video signal;

modulating said first delayed video signal by said difference signal to obtain a correction signal representative of the product of said first delayed video signal and said difference signal; and applying said correction signal in synchronism with said first delayed video signal to cathode ray tube deflection means for vertically deflecting the electron beam by an amount and in a direction corresponding to the amplitude and polarity, respectively, of said correction signal so as to enhance the horizontal edges of the television image.

19. In a television receiver having a cathode ray tube for converting a video signal to a televison image by scanning a luminescent screen with an electron beam modulated by video information, a system for improving the sharpness of low amplitude video transitions in the video signal and for enhancing the sharpness of the horizontal edges in the displayed television image comprising:

a video signal source;

circuit means receiving the video signal for non-linearly amplifying the video signal such that the large amplitude components of the video signal are amplified to a lesser extent than the small amplitude components so as to produce a compressed video signal;

a high pass peaking circuit receiving said compressed video signal for generating high frequency peaking components;

means for adding said video signal high frequency peaking components to produce a selectively peaked video signal;

means for applying said selectively peaked video signal to the cathode ray tube for intensity modulating the electron beam;

first delay means connected to said video signal source for delaying the video signal by one horizontal line time, thus generating a first delayed video signal at the output of said first delay means;

means for applying said first delayed video signal to the cathode ray tube for modulating the scanning electron beam;

second delay means receiving the first delayed video signal for delaying it an additional one horizontal line time so as to generate a second delayed video signal at the output of said second delay means;

means for comparing the video signal from said video signal source with the output of said second delay means to generate a difference signal whose amplitude is representative of the amplitude differences between said video signal and said second delayed video signal;

means receiving said difference signal and said first delayed video signal for modulating said first delayed video signal by said difference signal to obtain a correction signal representative of the product of said signals; and means for applying said correction signal in synchronism with said first delayed video signal to cathode ray tube deflection means for vertically deflecting the electron beam by an amount and in a direction corresponding to the amplitude and polarity, respectively, of said correction signal so as to enhance the horizontal edges of the television image.

20. In a television receiver having a cathode ray tube for converting a video signal to a television image by scanning a luminescent screen with an electron beam modulated by video information, a system for improving the sharpness of low amplitude video transition in the video signal and for enhancing the sharpness of the horizontal edges in the displayed television image comprising:

a video signal source;

a high pass peaking circuit receiving said video signal for developing therefrom high frequency peaking components;

circuit means receiving said high frequency peaking components for non-linearly amplifying said peaking components such that the large amplitude peaking components are amplified to a lesser extent than the small amplitude peaking components to generate a compressed peaking signal;

means for adding the output of said non-linear amplifier to said video signal to produce a selectively peaked video signal;

means for applying said selectively peaked video signal to the cathode ray tube for intensity modulating the electron beam;

first delay means connected to said video signal source for delaying the video signal by one horizontal line time, thus generating a first delayed video signal at the output of said first delay means;

means for applying said first delayed video signal to the cathode ray tube for modulating the scanning electron beam;

second delay means receiving the first delayed video signal for delaying it an additional one horizontal line time so as to generate a second delayed video signal at the output of said second delay means;

means for comparing the video signal from said video signal source with the output of said second delay means to generate a difference signal whose amplitude is representative of the amplitude differences between said video signal and said second delayed video signal;

means receiving said difference signal and said first delayed video signal for modulating said first delayed video signal by said difference signal to obtain a correction signal representative of the product of said signals; and means for applying said correction signal in synchronism with said first delayed video signal to cathode ray tube deflection means for vertically deflecting the electron beam by an amount and in a direction corresponding to the amplitude and polarity, respectively, of said correction signal so as to enhance the horizontal edges of the television image.

21. For use in a television receiver which converts a video signal to a displayed television image on a cathode ray tube which generates at least one electron beam for scanning a luminescent screen at a nominal velocity $v_1$ in line-by-line fashion, a method of enhancing the sharpness of horizontal and vertical edges of video amplitude transitions in the television image by auxiliary horizontal and vertical deflection of the cathode ray tube electron beam, comprising:

For Enhancing the Sharpness of Vertical Edges:
increasing the scan velocity of the beam above $v_1$ prior to a video amplitude transition so as to cause the beam to jump ahead to a position where a sharp transition edge is to be established;

reducing the scan velocity of the beam from the time when the beam arrives at the position where the sharp transition edge is to be established until the video amplitude transition has passed; and thereafter resuming the nominal scan velocity $v_1$ of the beam; and For Enchancing the Sharpness of Horizontal Edges:
deflecting the electron beam vertically when the beam scans a high brightness region which is vertically adjacent to a region of lower brightness so as to cause the electron beam spot to move away from the region of lower brightness and thereby keep said vertically adjacent regions visibly distinct.

22. For use in a television receiver which converts a video signal to a displayed television image on a cathode ray tube which generates at least one electron beam for scanning a luminescent screen at a nominal velocity $v_1$ in line-by-line fashion, a method of enhancing the sharpness of horizontal and vertical edges of video amplitude transitions in the television image by auxiliary horizontal and vertical deflection of the cathode ray tube electron beam, comprising:

For Enhancing the Sharpness of Vertical Edges:
increasing the scan velocity of the beam above $v_1$ immediately prior to a video amplitude transition so as to cause the beam to jump ahead to a position where a sharp transition edge is to be established;

reducing the scan velocity of the beam when the beam arrives at the position where the sharp transition edge is to be established; and resuming the nominal scan velocity $v_1$ of the beam after the video amplitude transition has passed; and For Enhancing the Sharpness of Horizontal Edges:
delaying the video signal for an interval equal to one horizontal line time to generate a first delayed video signal;

applying said first delayed video signal to the cathode ray tube to intensity modulate the scanning electron beam;

delaying the first delayed video signal for an interval equal to one horizontal line time to generate a second delayed video signal;

comparing the video signal with said second delayed video signal to generate a difference signal whose amplitude is representative of the amplitude differences between said video signal and said second delayed video signal;

modulating said first delayed video signal by said difference signal to obtain a correction signal representative of the product of said first delayed video signal and said difference signal; and applying said correction signal in synchronism with said first delayed video signal to cathode ray tube deflection means for vertically deflecting the electron beam by an amount and in a direction corresponding to the amplitude and polarity, respectively, of said correction signal so as to enhance the horizontal edges of the television image, whereby both the vertical and horizontal edges of television images are sharpened so as to present a clearer and more pleasing television picture.

23. A method as set forth in claim 22 wherein the electron beam of the cathode ray tube has a spot size at the screen which grows with increasing beam current and wherein, when the beam arrives at the position where the sharp transition edge is to be established, the scan velocity of the beam is reduced to a rate which corresponds to the rate of change in the size of the diameter of the spot so as to substantially arrest the trailing edge of the spot in the case of a video amplitude transition which causes an increase in spot size, and so as to substantially arrest the leading edge of the spot in the case of a video amplitude transition which causes a decrease in spot size, thus causing displayed video transitions to have better defined edges.

24. A method as set forth in claim 23, wherein, when the spot size of the beam substantially ceases to grow, the center of the spot is held substantially stationary for an interval which corresponds to the total time thus gained over a beam travelling at a uniform velocity $v_1$.

25. For use in a television receiver which converts a video signal to a displayed television image on a cathode ray tube which generates at least one electron beam for scanning a luminescent screen at a nominal velocity $v_1$ in line-by-line fashion, a method of peaking the video signal without causing excessive spot size growth of the cathode ray tube electron beam and of enhancing the sharpness of the vertical and horizontal edges of video images by auxiliary horizontal and vertical deflection of the cathode ray tube electron beam so as to compensate for large electron beam spot sizes which are generated by large amplitude video transitions, comprising:

For Enhancing the Sharpness of Vertical Edges:

increasing the scan velocity of the beam above $v_1$ prior to a video amplitude transition so as to cause the beam to jump ahead to a position where a sharp transition edge is to be established;

reducing the scan velocity of the beam when the beam arrives at the position where the sharp transition edge is to be established; and resuming the nominal scan velocity $v_1$ of the beam after the video amplitude transition has passed; and For Enchancing the Sharpness of Horizontal Edges:

delaying the video signal for an interval equal to one horizontal line time to generate a first delayed video signal;

applying said first delayed video signal to the cathode ray tube to intensity modulate the scanning electron beam;

delaying the first delayed video signal for an interval equal to one horizontal line time to generate a second delayed video signal;

comparing the video signal with said second delayed video signal to generate a difference signal whose amplitude is representative of the amplitude differences between said video signal and said second delayed video signal;

modulating said first delayed video signal by said difference signal to obtain a correction signal representative of the product of said first delayed video signal and said difference signal; and applying said correction signal in synchronism with said first delayed video signal to cathode ray tube deflection means for vertically deflecting the electron beam by an amount and in a direction corresponding to the amplitude and polarity, respectively, of said correction signal so as to enhance the horizontal edges of the television image; and For Peaking the Video Signal:

generating, from the amplitude transitions of said video signal, peaking components whose amplitudes are non-linearly related to the amplitudes of the video transitions from which they are derived; and adding said peaking components to the video signal to generate a peaked video signal with which to intensity modulate the cathode ray tube electron beam, the nonlinear relationship between the amplitude of said peaking components and their respective video signal amplitude transitions being such that the large amplitude video transitions are peaked relatively less than the small amplitude video transitions, thus providing the cathode ray tube with selectively peaked video signals for producing sharp television images without excessive electron beam spot size growth and providing for increased sharpness of the images thus produced by modulating the electron beam scan velocity and position to compensate for the blurring effect of spot size growth which is associated with large amplitude video transitions.

26. A method as set forth in claim 25 wherein said peaking components are generated by:

non-linearly amplifying the video signal so that the large amplitude components of the video signal are amplified to a lesser extent than the small amplitude components so as to produce a compressed video signal; and passing said compressed video signal through a high pass peaking circuit to generate high frequency peaking components.

27. A method as set forth in claim 25 wherein said peaking components are generated by:

passing said video signal through a high pass peaking circuit for generating high frequency peaking components; and non-linearly amplifying the output of said high pass peaking circuit such that the large amplitude peaking components are amplified to a lesser extent than the small amplitude peaking components.

28. A method as set forth in claim 25 wherein the electron beam of the cathode ray tube has a spot size at the screen which grows with increasing beam current and wherein, when the beam arrives at the position where the sharp transition edge is to be established, the scan velocity of the beam is reduced to a rate which corresponds to the rate of change in the size of the diameter of the spot so as to substantially arrest the trailing edge of the spot in the case of a video amplitude transition which causes an increase in spot size, and so as to substantially arrest the leading edge of the spot in the case of a video amplitude transition which causes a decrease in spot size, thus causing displayed video transitions to have better defined edges.

29. A method as set forth in claim 28 wherein, when the spot size of the beam substantially ceases to grow, the center of the spot is held substantially stationary for an interval which corresponds to the total time thus gained over a beam travelling at a uniform velocity $v_1$.

* * * * *